United States Patent
Trueblood

[15] 3,661,490
[45] May 9, 1972

[54] INJECTION MOLDING MACHINE
[72] Inventor: Raymond Lee Trueblood, New Carlisle, Ohio
[73] Assignee: Trueblood, Inc., Tipp City, Ohio
[22] Filed: Jan. 29, 1970
[21] Appl. No.: 6,801

[52] U.S. Cl..............................425/243, 165/86, 164/326, 425/246
[51] Int. Cl........................................................B29c 3/02
[58] Field of Search......................18/20 B, 20 C, 20 H, 20 R, 18/20 S, 20 T, 26 RR, 30 NA, 30 NZ, 30 PR, DIG. 9, 20 RR, 30 PM, 30 PQ; 25/99, 100, 80, 81; 165/86; 137/580; 164/326–328

[56] References Cited

UNITED STATES PATENTS

| | | | |
|---|---|---|---|
| 2,828,508 | 4/1958 | Labarre | 18/20 I X |
| 2,064,624 | 12/1936 | Napier | 18/20 S |
| 2,325,348 | 7/1943 | Tucker | 18/20 S |
| 2,304,806 | 12/1942 | Di Cosmo | 18/20 T X |
| 3,364,523 | 1/1968 | Schippers | 18/12 SZ |
| 3,091,809 | 6/1963 | Trueblood | 18/20 C UX |
| 2,325,119 | 7/1943 | Flowers | 18/20 S |
| 1,969,323 | 8/1934 | Person | 18/20 RR |
| 3,365,748 | 1/1968 | Cote | 18/20 B X |
| 2,117,400 | 5/1938 | Cobb | 18/20 C |
| 2,155,316 | 4/1939 | Lauterbach | 18/20 T |
| 3,200,451 | 8/1965 | Worswick | 164/326 X |
| 1,492,017 | 4/1924 | Candler | 164/327 |
| 2,333,056 | 10/1943 | Thoreson et al. | 18/20 H X |

FOREIGN PATENTS OR APPLICATIONS

| | | | |
|---|---|---|---|
| 1,204,772 | 1959 | France | 137/580 |

OTHER PUBLICATIONS

German Printed Specification – 1966 – Germany – Gill

Primary Examiner—J. Spencer Overholser
Assistant Examiner—De Walden W. Jones
Attorney—Marechal, Biebel, French & Bugg

[57] ABSTRACT

A plastic injection molding machine has a rotary indexing table and means supporting a stationary vertical standard which passes through a bore in the center of the table. A rotary fluid manifold is positioned concentrically about the standard and includes a pair of tubular sleeves having means between them defining axially spaced annular delivery and return passages. The outer sleeve is mounted on the rotary table for rotation therewith and the inner sleeve is keyed to the support standard. The manifold is provided with delivery and return bores in the inner sleeve which communicate with their respective passages and a plurality of outlets from the delivery passage and a plurality of inlets to the return passage to provide for rotary circulation of fluid through a plurality of mold parts spaced about the periphery of the indexing table. The vertical standard adds stability to the rotary table, and the manifold and standard cooperate to permit distribution of fluid to mold parts irrespective of their position on the table.

4 Claims, 3 Drawing Figures

PATENTED MAY 9 1972
3,661,490
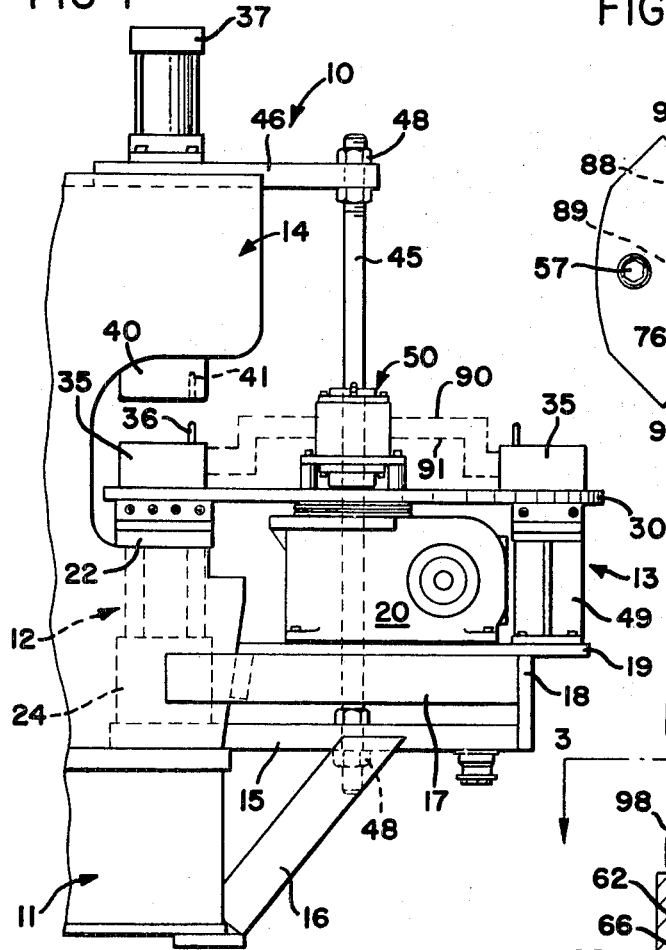
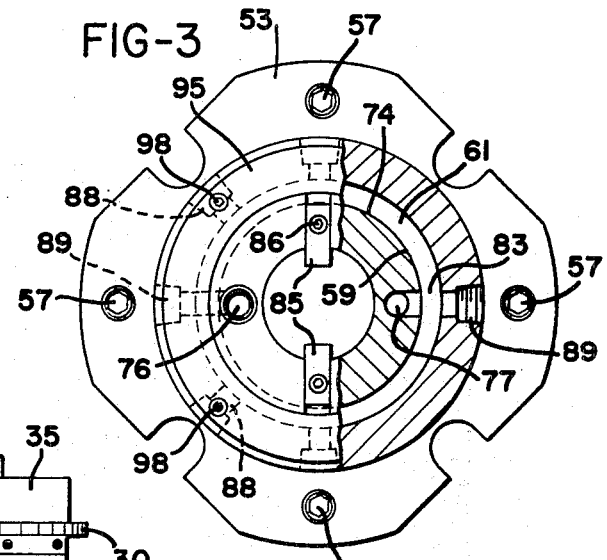
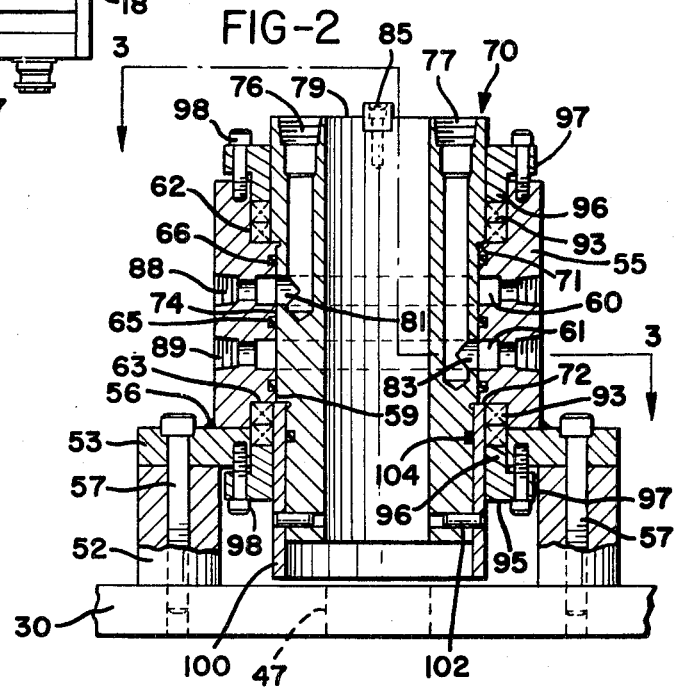
INVENTOR
RAYMOND LEE TRUEBLOOD
BY Marechal, Biebel, French & Bugg
ATTORNEYS

INJECTION MOLDING MACHINE

BACKGROUND OF THE INVENTION

Plastic injection molding machines of the type described in E. D. Trueblood U.S. Pat. No. 3,309,739, issued Mar. 21, 1967, include a bolster head and a movable table. When such a machine is provided with a rotary index table, the bolster head carries a vertically reciprocating upper mold part which selectively engages one of a plurality of bottom mold parts positioned around the periphery of the table. During this operation the other bottom mold parts are accessible for cooling, stripping and loading by inserting into the mold cavity any special parts for the finished article.

In order to obtain uniform and quality products, such as electrical plug-in connectors on the ends of wires or the like, it is imperative that the upper and bottom mold parts come together with precise alignment so that the parts will form pressure seals before the plastic is injected under pressure, and thereby prevent plastic from seeping out between the parts. One of the problems encountered is that when the force of the upper mold part is exerted on the periphery of the indexing table, there is a tendency for the table to deflect under the high pressures and to cause slight breaks in the seal between the parts.

A clear need has been presented in the art for a means of adding stability to the table and for a fluid manifold which could be used in cooperation with the stabilizing means for supplying cooling or heating fluid to the bottom mold parts. Ideally, the manifold would be positioned at the center of the indexing table and provide rotary distribution of the fluid to the plurality of bottom mold parts irrespective of their position on the periphery of the table.

SUMMARY OF THE INVENTION

The present invention relates to injection molding machines and more particularly to an injection molding machine with improved means for stabilizing the indexing table thereof and for supplying fluid to a plurality of mold parts mounted on the periphery of the indexing table.

In general, the present invention provides for a stationary vertical standard which passes through a bore in the indexing table and for a rotary fluid manifold which is in part keyed to the standard and in part mounted on the table. The rotary manifold provides for rotary circulation of fluid through the mold parts, irrespective of their radial position on the table. Further the manifold of the invention permits the vertical support standard to add stability to the indexing table when high pressures are exerted on the outer periphery and at one side thereof.

In accordance with a preferred embodiment of the manifold, a pair of sleeves are concentrically positioned about the vertical support standard. An outer sleeve is mounted on the rotary indexing table for rotation therewith and an inner sleeve is keyed to the support standard. Separate axially spaced annular delivery and return passages are formed between the sleeves and cooperate with axially extending delivery and return bores in the inner sleeve and a plurality of outlets from the delivery passage and a plurality of inlets to the return passage to circulate fluid from an external source through the mold parts on the table.

Packing rings are located at the upper and lower ends of the sleeves and seal the sleeves externally, while O-rings seal the spaced passages internally. An effective axial pressure tight seal is formed across the ends of the respective sleeves by an annular member at each end which has an inner radial portion for bearing against the inner sleeve and a radially extending flange portion for fastening to the outer sleeve. Fastening means tighten the flange portion against the packing rings to complete the sealing thereof.

BRIEF DESCRIPTION OF THE DRAWING

FIG. 1 is a partially cut away side elevation of a plastic injection machine having a rotary indexing table carrying a plurality of bottom mold parts around the periphery thereof and showing in accordance with the present invention a vertical support standard passing through a bore in the center of the table and a rotary fluid manifold mounted on the table about the standard;

FIG. 2 is a cross sectional view of the rotary fluid manifold of the present invention; and FIG. 3 is a top view of the manifold taken along line 3—3 in FIG. 2.

DETAILED DESCRIPTION OF THE PREFERRED EMBODIMENT

Referring to FIG. 1, a plastic injection molding machine 10 includes a base portion 11, a central support portion 12, an indexing table assembly 13 supported by the base and central support portions of the machine, and an overhanging bolster head 14. A horizontal plate 15 is supported by the base 11 and by angle struts 16, and a horizontal platform 17 is supported by the central support portion 12 and by a vertical plate 18 connecting the platform 17 with the plate 15.

The indexing table assembly 13 includes a flat plate 19 which supports an automatic indexing mechanism 20. A vertical deflection support plate 22 is positioned beneath the table under the head 14 and is supported by means 24 (dotted lines) in the central support portion 14 of the machine. A rotatable indexing table 30 is supported on the top of the indexing mechanism and carries a plurality of peripherally spaced bottom mold parts 35 with locating pins 36 extending upwardly therefrom.

The overhanging bolster head 14 supports a hydraulic fluid cylinder 37 and an associated bolster head and cam locking mechanism (not shown) to provide for the vertical reciprocation of an upper mold part 40, and the reciprocating and mold locking arrangement may preferably be made according to the teachings of the U.S. Pat. of Trueblood No. 3,309,739 issued Mar. 21, 1967. The indexing mechanism 20 rotates the indexing table in timed sequence so that a bottom mold part is selectively rotated in position immediately below the upper mold part 40. The upper mold part may thus be formed with a suitable recess or bore 41 for receiving the locating pin 36 on the bottom mold part. This position defines the injection station during which time the upper mold part 40 is brought with high force into closing relation to the bottom mold part 35 and an injection cylinder (not shown) moves axially forwardly and carries a nozzle which mates with cooperating nozzles formed on the mold parts for injecting the mold cavity. The plasticizing cylinder and control arrangement may be constructed according to the Patent of Trueblood, 3,436,793 issued Apr. 8, 1969, and may include a hydraulically operated nozzle valve as shown in that patent or a mechanically operated valve as shown in Trueblood, U.S. Pat. No. 3,172,161 of Mar. 9, 1965.

During the mold closing and injecting step very high forces are established tending to separate the mold parts 40 and 35 and correspondingly high closing forces must be maintained in order to prevent separation of the mold parts. The deflection plate 22 positioned immediately below the injection station and below the indexing table 30 absorbs a substantial portion of this high force. However, a more rigid structure may be maintained by the employment of a tension member, in effect connecting the machine head 14 with the base 11. For this purpose the indexing table assembly 13 is provided with a vertical support standard or post 45 which is supported at its upper end on a cantilevered plate 46 and which is supported at its lower end on the horizontal plate 15. The plates 46 and 15 define respectively upper and lower support means for the post 45. The post 45 stands vertically through a bore 47 in the center of the table 30 and in non-interferring relation with the molding operation. Suitable tightening nuts 48 are provided to secure the post against rotation and to take up all of the play.

The lower mold parts 35 are preferably formed as universal mold shoes which carry a chargeable die or insert. These mold parts are further provided with fluid heating or cooling passageway through which liquid, such as water, may pass for stabilizing the temperature of the mold. In some instances, it may be desirable to apply a heated fluid to the mold parts, but often it is more desirable to provide a cooling fluid so that the injected material may be rapidly cooled and ejected. For this purpose a diametrically opposed ejecting station is provided at which position the parts may be ejected by a suitable knock-out cylinder 49, which may be constructed according to the teaching of Trueblood, U.S. Pat. No. 3,091,809, issued June 4, 1963.

A rotary fluid manifold 50 is positioned on the table 30 concentrically of the vertical support standard or post 45. Referring to FIG. 2, which shows the manifold 50 in cross-section with the post 45 removed for clarity, a plurality of cylindrical spacers 52 are interposed between an annular ring 53 and the indexing table 30. The annular ring 53 supports a tubular outer sleeve 55 and is integrally connected thereto by means of a circumferential weld 56. A plurality of fastening bolts 57 pass through appropriate bores 58 in the annular ring 53 and through the spacers 52 to secure the outer sleeve annular ring assembly to the indexing table 30 for rotation with the table.

The outer sleeve 55 has an inner cylindrical wall 59 having means defining a first annular delivery groove 60 and a second annular return groove 61 axially spaced from the first groove, and further includes a first circumferential enlarged notch or step 62 at the upper end thereof and a second correspondingly enlarged circumferential notch or step 63 at the lower end thereof. The sleeve 55 is also provided with three circumferential slots or grooves 65 between and on each side of the annular grooves 60 and 61. Resilient O-rings 66 are disposed within each of the slots 65.

The manifold 50 further includes a non-rotating tubular inner sleeve 70 which has a stepped outer surface defining a first circumferential radial shoulder 71, which is rotatably supported by an inner portion of the first circumferential notch 62 in the outer sleeve 55, and a second circumferential radial shoulder 72, the radial surface of which is coincident with a portion of the second circumferential notch 63 in the outer sleeve 55. The outer surface of the sleeve 70 has a central cylindrical portion 74 which extends between the shoulders 71 and 72 and mates against the inner wall 59 of the outer sleeve to thereby define with the annular grooves 60 and 61 corresponding annular passages between them. An axially aligned delivery bore 76 and an axially aligned return bore 77 are formed in opposite radial sides of the upper axial face 79 of the inner sleeve and penetrate to an axial depth corresponding approximately with the axial positions of their respective delivery passage 60 and return passage 61. The inner sleeve 70 is provided with radial openings 81 and 83 for communicating the delivery bore 76 with the delivery passage 60 and the return bore 77 with the return passage 61, respectively. In addition, as shown in FIG. 3, a pair of keys or tabs 85 are secured by bolts 86 to opposite sides of the inner sleeve 70 and are adapted to be keyed into slots in the stationary vertical standard 45 so that the inner sleeve 70 will remain fixed thereto.

As shown in FIGS. 2 and 3, the outer sleeve 55 has a plurality of radially spaced outlets 88 leading from the delivery passage 60 and a corresponding plurality of radially spaced inlets 89 opening into the return passage. As represented by the dotted lines in FIG. 1, these inlets and outlets are adapted to receive flexible delivery tubing 90 and return tubing 91 which communicate the internal passages with the plurality of bottom mold parts 35 located around the periphery of the indexing table.

In the preferred embodiment of the rotary manifold, rotary packing means are provided for the inner and outer sleeves at the ends thereof. Preferably, rotary packing rings 93 are positioned within the notch 62 and the lower notch 63 in the outer sleeve 55, and are held in position by a pair of annular retainer ring members 95 which are L-shaped in cross-sectional configuration. The annular members 95 have an inner cylindrical portion 96 for bearing against the packing and a radially extending portion 97 having a plurality of bores therethrough for receiving a plurality of fastening members 98 for tightening the members 95 against the packing rings 93 to compress them and complete the sealing thereof.

As shown in FIG. 2, a tubular bushing member 100 is interposed between the inner sleeve 70 and the packing rings 93 in the lower circumferential notch 63. The member 100 is secured to the inner sleeve 70 by fastening pins 102 and is wide enough to bridge the interface between the sleeves. An O-ring 104 forms a seal between the sleeve 70 and the member 100. Its upper end mates against the second shoulder 72 and against a portion of the notch 63, due to the coincidence of the shoulder 72 with the notch 63. The inside surface of the annular member 95 bears against the bushing member 100.

In general operation, the outer sleeve 55 is first secured to the indexing table 30 and the first shoulder 71 of the inner sleeve 70 is positioned on the first notch 62 of the outer sleeve. The inner sleeve 70 is then keyed to the vertical support standard 45 so that the O-rings 66 are compressed to seal the annular passages 60 and 61 from each other, and the annular members 95 are tightened to compress the packing rings 93 and the O-ring 104 between the bushing member 100 and the inner sleeve 70. Fluid under pressure from an external source (not shown) is then connected to the manifold 50 at the inlet to the delivery bore 76 and the injection molding machine is started. As the indexing table 30 rotates, the outer sleeve 55 will rotate with it and the first shoulder 71 will ride on the first notch 62, and the outlets 88 and the inlets 89 will remain in opposed relation to the particular bottom mold part 35 with which it is cooperating by way of the delivery tubing 90 and return tubing 91. Therefore, fluid will travel to the mold part through the delivery tubing 90 by moving through the delivery bore 76 and its associated radial opening 81 to the delivery passage 60 and out the appropriate radial outlet 88. In like manner, fluid will leave the mold part by passing through the return tubing 91 to the return passage 61, and by traveling around the passage 61 until it reaches the opening 83 to the return bore 77 from which it will be removed from the assembly.

The present invention accordingly provides a means of adding stability to the table and for offsetting the tendency of the table to deflect upon exertion of force by the upper mold part against the bottom mold part, and at the same time provides a means of rotary circulation of fluid through bottom mold parts irrespective of their position on the periphery of the table. The stationary vertical standard and the rotary fluid manifold effectively and efficiently cooperate with each other to provide a simple and effective means of obtaining the results desired.

While the form of apparatus herein described constitutes a preferred embodiment of the invention, it is to be understood that the invention is not limited to this precise form of apparatus, and that changes may be made therein without departing from the scope of the invention.

I claim:

1. In an injection molding machine having a rotary indexing table for supporting a plurality of mold parts thereabout and in which a vertical standard extends through the table defining an axis about which the table turns and forms a support structure for the molding machine, the improvement in a rotary fluid manifold for applying heating and cooling fluids to the die parts supported on such table, comprising means defining an outer sleeve having an inside cylindrical opening extending axially therethrough, means mounting said outer sleeve on said table for rotation therewith with said standard extending through said opening, means in said outer sleeve at said cylindrical opening forming first and second axially spaced annular grooves, means in said outer sleeve defining passages leading into said grooves and providing connection means by which heating and cooling fluids may be connected to such mold parts for flow therethrough, a tubular inner sleeve having an inside surface mounted on and fixed to said standard and having an outer cylindrical surface in mating engagement with the said inside cylindrical surface of said outer sleeve and closing said annular grooves thereby defining corresponding first and second annular flow passages between said sleeves, means in said sleeves sealing said passages one from the other, and means in said inner sleeve defining an inlet passage leading into one of said annular passages and an outlet passage leading into the other of said annular passages by means of which such fluid may be applied to the die parts.

2. The improved manifold of claim 1 in which said inlet and outlet passages in said inner sleeve are axially positioned therein and terminate at an upper radial portion of said inner sleeve.

3. The improved manifold of claim 1 further comprising packing rings adjustably mounted on said outer sleeve at the axial top and bottom ends thereof, and packing means interposed between said sleeves and engageable by said packing rings for forming a fluid-tight seal therebetween.

4. In an injection molding machine having a rotary indexing table for supporting a plurality of mold parts thereabout and in which a vertical standard extends through the table defining an axis about which the table turns and forms a support structure for the molding machine, the improvement in a rotary fluid manifold for applying heating and cooling fluids to the die parts supported on such table, comprising means defining an outer sleeve having an inside cylindrical opening extending axially therethrough, means mounting said outer sleeve on said table for rotation therewith with said standard extending through said opening, a tubular inner sleeve having an inside surface mounted on and fixed to said standard and having an outer cylindrical surface in close running engagement with the said inside cylindrical surface of said outer sleeve, means in said manifold defining first and second axially spaced annular flow passages between said sleeves, means in said sleeves sealing said passages one from the other, means in said outer sleeve defining openings leading into said passages and providing connection means by which heating and cooling fluids may be connected to such mold parts for flow therethrough, and means in said inner sleeve defining an inlet passage leading into one of said annular passages and an outlet passage leading into the other of said annular passages by means of which such fluid may be applied to the die parts.

* * * * *